United States Patent [19]
Bates

[11] 3,965,421
[45] June 22, 1976

[54] AUTOMATIC MASTER-SLAVE CARRIER SWITCHING CIRCUIT

[75] Inventor: Wayne Joseph Bates, Des Plaines, Ill.

[73] Assignee: Motorola, Inc., Schaumburg, Ill.

[22] Filed: Dec. 19, 1974

[21] Appl. No.: 534,537

[52] U.S. Cl. ................................. 325/17; 325/49; 325/58
[51] Int. Cl.² .......................................... H04B 1/38
[58] Field of Search ............... 325/49, 50, 20–22, 325/57, 58, 17; 343/175–181; 179/15 FS

[56] References Cited
UNITED STATES PATENTS

| | | | |
|---|---|---|---|
| 2,510,461 | 6/1950 | Bruck et al. | 325/17 |
| 2,757,279 | 7/1956 | Vosburgh | 325/17 |
| 2,766,324 | 10/1956 | Peth | 325/57 |
| 3,283,074 | 11/1966 | Csicsatka | 325/22 |
| 3,750,179 | 7/1973 | Tewksbury | 343/175 |
| 3,808,368 | 4/1974 | Pitroda | 325/58 |
| 3,813,598 | 5/1974 | Stuart | 325/49 |
| 3,925,729 | 12/1975 | Amoroso | 325/17 |

*Primary Examiner*—George H. Libman
*Attorney, Agent, or Firm*—James W. Gillman; Eugene A. Parsons

[57] ABSTRACT

A suppressed carrier, communications system including at least two spaced apart transceivers wherein a portion of the carrier is transmitted for synchronizing both transmitters and receivers, the apparatus including a carrier oscillator and filters for separating the transmitted carrier from the received signal with a local and remote transistor switch and a priority lockout flip-flop for applying the internal carrier oscillator when the local transmitter is operated with no signal being received and the separated carrier is utilized when a signal is received before the local transmitter is operated.

8 Claims, 3 Drawing Figures

AUTOMATIC MASTER-SLAVE CARRIER SWITCHING CIRCUIT

BACKGROUND OF THE INVENTION

1. Field of the Invention

The present invention is utilized in suppressed carrier communications systems, generally single sideband, wherein a small portion of the carrier is transmitted for use at the receiver to synchronize the remote receiver to the transmitter supplying the carrier. In suppressed carrier communications systems it is generally necessary to transmit a synchronizing signal for proper detection of the signal at the receiver. The carrier is originally suppressed to save power in the system, but it is convenient to allow a small portion of the carrier to leak into the transmitted signal (a small portion of the carrier may be intentionally injected or a poor filter may be utilized to remove the carrier so that a small portion is left) for use in detection at the receiver.

2. Description of the Prior Art

In prior art systems the transmitter is utilized as the master which transmits a portion of the carrier whenever it is operating, and the remote receiver is always the slave which is synchronized with the transmitter. Thus, in any specific transceiver the signal being transmitted and the signal being received are not synchronized, which can be a substantial disadvantage in many situations where data is being transmitted and the correct transmission of the data is checked by comparing the transmitted data with data received from the remote transmitter. Further, since each transmitter in the system must always operate as a master and transmit small portions of the carrier, some additional energy is consumed in transmissions.

SUMMARY OF THE INVENTION

The present invention pertains to a suppressed carrier, communications system including at least two, spaced apart, transceivers wherein the first transmitter operated becomes the master and the local receiver as well as the remote transmitter and receiver are all synchronized to the master transmitter by receiving a small portion of the carrier therefrom. Each of the transceivers contains circuitry for disconnecting and turning off its local oscillator if a message is received before the local transmitter is actuated and for utilizing the carrier from the internal oscillator if the local transmitter is operated before a message is received.

It is an object of the present invention to provide an improved suppressed carrier communications system.

It is a further object of the present invention to provide a suppressed carrier, communications system including at least two, spaced apart, transmitter-receivers wherein the first transmitter operated becomes the master and the local receiver as well as the remote transmitter and receiver are synchronized by receiving a portion of the carrier therefrom.

These and other objects of this invention will become apparent to those skilled in the art upon consideration of the accompanying specification, claims and drawings.

BRIEF DESCRIPTION OF THE DRAWINGS

Referring to the drawings wherein like characters indicate like parts throughout the figures:

FIG. 3 is a schematic diagram of a portion of the circuitry illustrated in FIG. 2.

DESCRIPTION OF THE PREFERRED EMBODIMENT

Figure 1:
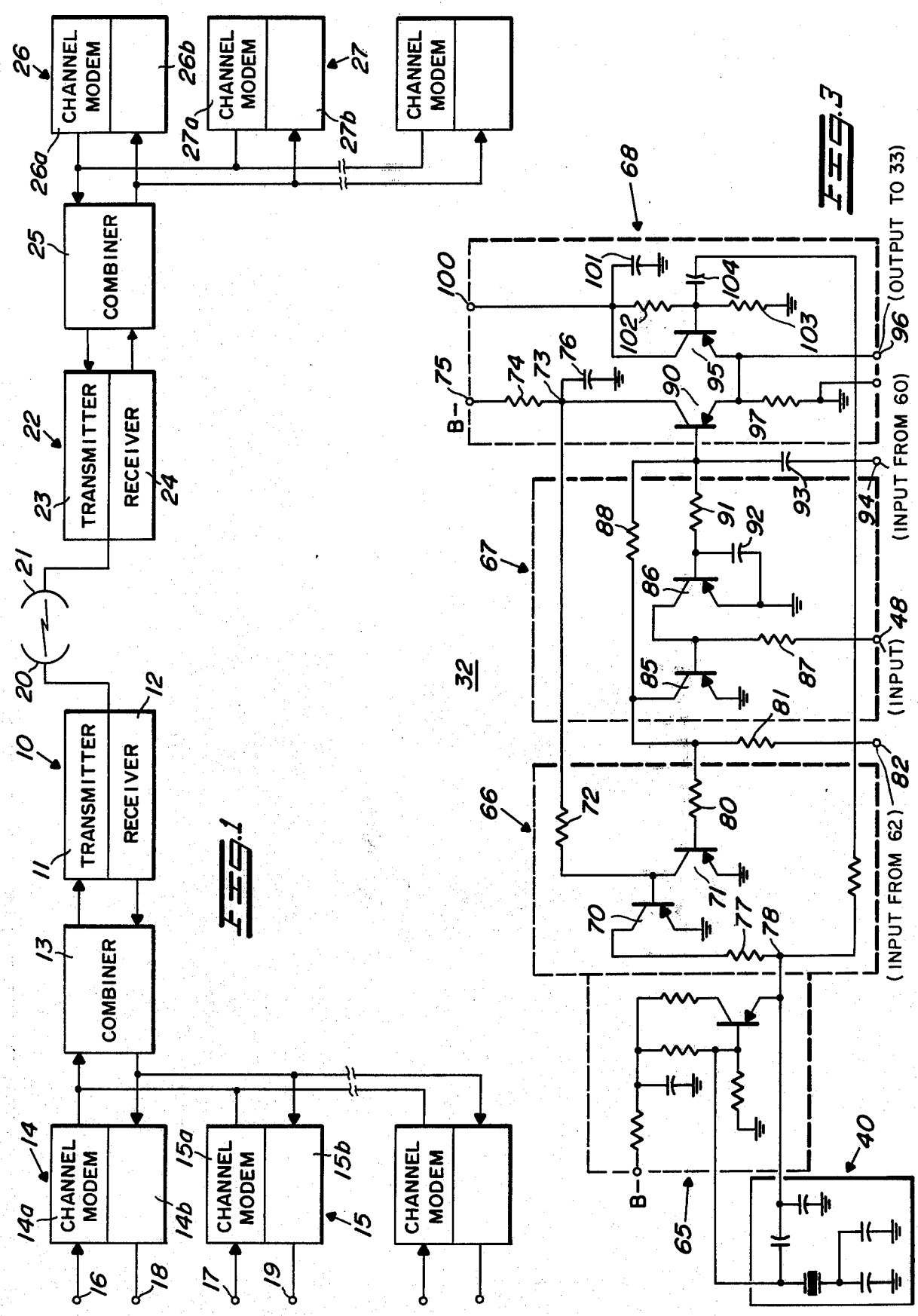
FIG. 1 is a block diagram of a suppressed carrier, multiplexed communications system.

Referring specifically to FIG. 1, a transceiver generally designated 10, including a transmitter 11 and a receiver 12, which forms a portion of the communications link, is illustrated. A combiner or multiplexer 13 combines or multiplexes signals from a plurality of channel modems 14, 15, etc. for application to the transmitter 11 and separates signals from the receiver 12 for application to the appropriate modems. Each of the channel modems, 14, 15, etc. receives input signals, which may be for example voice frequency signals from a telephone trunk, at inputs thereto designated 16, 17, etc., and supplies signals at outputs designated 18, 19, etc., respectively. The transmitter 11 supplies signals to an antenna 20 which transmits signals to a remotely located antenna 21 connected to a transceiver, generally designated 22, including a transmitter 23 and a receiver 24. The remotely located unit is similar to the above described unit and includes a combiner 25 attached to a plurality of modems 26, 27, etc. In this system the transceiver 22, combiner 25 and modems 26, 27, etc., are identical to the transceiver 10, combiner 13, and modems 14, 15, etc., and it should be understood that, while only two units are illustrated, more such units can be included.

Each of the modems 14, 15, 26 and 27 are separated into an *a* and *b* portion, appropriately designated, which are the transmitter portion and the receiver portion thereof, respectively. Since a large number of modems are connected to the transceivers 10 and 22 through the combiners 13 and 25, the transceivers are essentially operating continuously and simply form a communications link for any pair of modems which may be communicating with each other. It should be understood, therefore, that when "master" and "slave" transmitters and receivers are referred to in the following description the transmitter portions *a* and receiver portions *b* of communicating modems are being referred to, and not the communicating link transceivers 10 and 22. However, when a smaller system not incorporating multiplexing is utilized the communicating transceivers may actually be controlled as will be described below.

Figure 2:
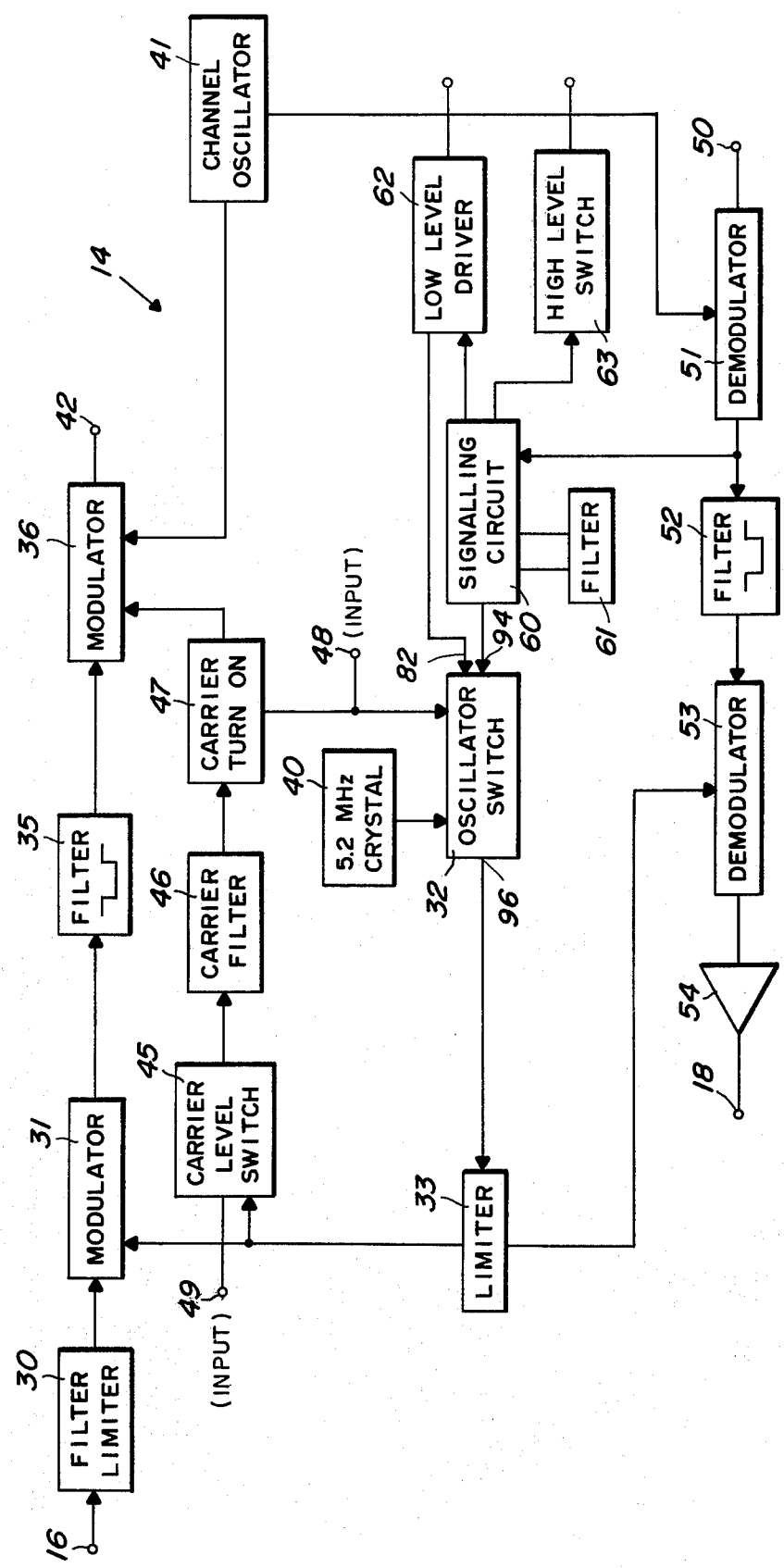
FIG. 2 is a block diagram of a portion of the circuitry illustrated in FIG. 1.

Referring specifically to FIG. 2, a more detailed block diagram of modem 14 is illustrated. It should be understood that all of the modems are identical and, while only modem 14 is described in detail, the description will apply equally well to all of the remaining modems. The input signal appearing at the input terminal 16 is applied through a filter and limiting circuit 30 to a first modulator 31. The first modulator 31 receives a high frequency carrier, which is applied from an oscillator/switch 32 through a limiter circuit 33. The oscillator/switch circuit 32 will be described in more detail with reference to FIG. 3. The modulated signal from the modulator 31 is applied through a special notch, or single sideband filter 35 to a second modulator 36. The modulators 31 and 36 and the filter 35 form the essential parts of the transmitter portion 14*a* of modem 14 along with several control functions to be described presently. The frequency supplied by the oscillator/switch 32 is chosen so that it is sufficiently high to allow the filter 35 to be constructed very small, while not being so high that difficulties, such as shielding and interaction between components, will occur. In the present embodiment, the oscillator/switch 32 is controlled by a 5.2 megahertz crystal 40 which is believed to be a near optimum frequency for the purposes described. The filter 35 is constructed to pass only the upper sideband from the modulator 31 and to remove the carrier and the lower sideband.

The second modulator 36 is in essence a mixer which receives a signal from a channel oscillator 41, which signal is equal in frequency to the carrier plus the frequency of the channel, for example, 5.260 megahertz. The modulator 36 then supplies an output signal to the combiner 13 on a lead 42 which is the difference frequency between the signal supplied to the modulator 36 by the filter 35 and the signal supplied by the channel oscillator 41. The signal on the lead 42 is combined with other signals, each having a characteristic channel frequency, in the combiner 13 and transmitted by the transmitter 11. The modulator 36 also receives a small portion of the carrier from the limiter 33 through a carrier level switch 45, a carrier filter 46 and a carrier turn-on circuit 47. A low level carrier is applied to the modulator 36 whenever the carrier turn-on circuit 47 is activated by a signal on an input terminal 48 and the carrier is raised to a high level by the carrier level switch 45 whenever a signal is applied to the input terminal 49 thereof. The operation of this circuitry is explained in more detail in the co-pending application entitled, "A Modem for a Suppressed Carrier Communications System," Ser. No. 534,388, Filed Dec. 19, 1974, and assigned to the same assignee.

Any return signals from the receiver 12 and combiner 13 are applied to an input terminal 50 of the modem 14, which applies the signals to a first demodulator 51. Demodulator 51 is essentially a mixer that receives the signal from the channel oscillator 41 and provides the difference frequency through a single sideband filter 52, which is similar to filter 35, to a second demodulator 53. Demodulators 51 and 53 and filter 52 form the essential parts of the receiver portion 14b of the modem 14 along with several control functions to be described presently. Since the single sideband filter 52 is tuned to accept only the channel frequency for modem 14, all other input signals mixed with the output of the channel oscillator 41 in the demodulator 51 are rejected and only the signals specifically intended for modem 14 to reach the demodulator 53. The demodulator 53 receives a carrier signal from the oscillator/switch 32 through the limiter 33 and demodulates the input signal to supply the desired unmodulated signal through an amplifier 54 to the output lead 18.

A portion of the signal from the demodulator 51 is applied to a signalling circuit 60 which includes a very narrow filter 61 for removing the carrier from the signal applied thereto. Whenever a carrier is present, that is the modem 14 is receiving a signal at its characteristic channel frequency, a signal is supplied from the circuit 60 to a low level driver circuit 62 which provides an indication of a received signal, as described in more detail in the above-referenced co-pending application. If the level of the carrier being supplied to the signalling circuit 60 is high, a signal is also applied to a high level switch 63 which then provides an indication of the reception of a high level carrier. A portion of the carrier from the signalling circuit 60 is also supplied to the oscillator/switch 32 for purposes which will be described in conjunction with FIG. 3. The signalling circuit 60 may be, for example, a simple amplifier having the filter 61 connected thereto so that the output supplied to the oscillator switch 32 at input 94 is only the carrier (at the characteristic channel frequency). Any circuit which can differentiate between a high level signal (approximately 3 db below a predetermined level) and a low level signal (approximately 18 db below the predetermined level) may be connected to the output of the amplifier to activate only the low level driver 62 when the output of the amplifier is the low level signal and to activate both the low level driver 62 and the high level switch 63 when the output of the amplifier is the high level signal. A signal indicating that the carrier has been received, which indicates that a remote modem transmitter portion (such as transmitter portion 26a) has been turned on and is in communication with the local modem receiver portion 14b, is supplied by the low level driver 62 to the oscillator/switch 32 for purpose which will be described in conjunction with FIG. 3.

Referring specifically to FIG. 3, the oscillator/switch circuit 32 is illustrated schematically. The oscillator/switch circuit 32 includes a carrier oscillator generally designated 65 having the crystal 40 attached thereto, an oscillator power swtich generally designated 66, a priority lockout circuit generally designated 67, and a local-remote switch generally designated 68. The carrier oscillator 65 is a quartz crystal controlled Colpitts circuit in the present embodiment but it should be understood that any desired oscillator which will provide the functions required may be utilized. The oscillator power switch 66 includes a pair of grounded emitter p-n-p type transistors 70 and 71. The base of the transistor 70 is connected to the collector of the transistor 71 and through a dropping resistor 72 to a terminal 73. Terminal 73 is connected through a resistor 74 to a power terminal 75 adapted to have a negative source of power attached thereto. A bypass capacitor 76 is connected between the terminal 73 and ground. The collector of the transistor 70 is connected through a resistor 77 to a terminal 78 connected to the carrier oscillator 65 for supplying operating power (providing a return path) to the oscillator and receiving the output carrier thereon. The base of the transistor 71 is connected through a pair of series connected resistors 80 and 81 to an input terminal 82, which is connected to the low level driver 62 (see FIG. 2) and receives a remote control signal which in this embodiment is a negative signal thereon when a signal of the correct channel frequency is received by the demodulator 51. In operation, the transistor 71 is normally non-conducting and the transistor 70 normally conducts to provide a return path for the carrier oscillator 65 for the proper operation thereof. When a negative signal appears on the terminal 82 the transistor 71 is biased into conduction which turns off the transistor 70 removing the return path from the carrier oscillator 65 and, therefore, essentially removing operating power from the transistor 65 and preventing the operation thereof.

The terminal 82 is also connected through the resistor 81 to the collector of a p-n-p type transistor 85, the emitter of which is grounded. The base of the transistor 85 is connected to the collector of a second p-n-p type transistor 86 and through a resistor 87 to the input terminal 48 (see FIG. 2) designed to receive the local control signal for operating the carrier turn-on circuit 47. The collector of the transistor 85 is connected through a resistor 88 to the base of a p-n-p type transistor 90 in the local-remote switch 68. The base of the transistor 90 is also connected through a resistor 91 to the base of the transistor 86, which base is connected through a bypass capacitor 92 to ground. The emitter of the transistor 86 is also grounded. The base of the transistor 90 is connected through a coupling capacitor 93 to an input terminal 94 which is connected to receive the separated 5.2 megahertz carrier signal from signalling circuit 60 (see FIG. 2).

The transistors 85 and 86 in the priority lockout circuit 67 form a flip-flop circuit wherein only one of the transistors can conduct at any one time and if one is conducting the other cannot be turned on. Thus, with a negative signal at the input terminal 82 the oscillator power switch 66 de-energizes the carrier oscillator 65, as previously described. Also, the negative signal is applied through the resistor 88 and the resistor 91 to turn on the transistor 86 which effectively grounds the base of the transistor 85 and further prevents conduction thereof. When no signal is applied to the terminal 82 and a negative signal is applied to the terminal 48 the transistor 85 is turned on providing a ground at the junction of the resistors 80 and 81 and preventing a subsequent signal on the terminal 82 from turning on the transistor 86. With the negative signal on the terminal 48 the transistor 71 is non-conducting and the transistor 70 is conducting to provide operating power or a return to the carrier oscillator 65. Thus, the circuit 67 includes a priority which locks out or prevents a subsequent signal on the terminals 48 or 82 from affecting the circuit 67 and the other circuits connected thereto.

The p-n-p transistor 90 and a second p-n-p transistor 95 have their emitters connected together and to a common output terminal 96 so that only one of the transistors 90 and 95 are conducting at any specific time. The emitters are also connected through a resistor 97 to ground. The collector of the transistor 90 is connected to the terminal 73, which is attached to the negative power source. The collector of the transistor 95 is connected to a terminal 100 having a lower source of negative voltage applied thereto and through a bypass capacitor 101 to ground. The base of the transistor 95 is connected to the junction of a pair of series connected resistors 102 and 103, which are connected between the terminal 100 and ground to provide a bias source for the transistor 95 which maintains the transistor 95 normally conducting. The terminal 78 (the output of the carrier oscillator 65) is connected through a coupling capacitor 104 to the base of the transistor 95.

Thus, the output of the carrier oscillator 65 is applied to the base of the transistor 95 and appears at the common output terminal 96 when the transistor 95 is conducting and the separated carrier appearing at the terminal 94 is applied to the base of the transistor 90 and appears at the common output terminal 96 when the transistor 90 is conducting. With no signal applied to either of the input terminals 48 and 82, the transistor 95 is biased into conduction and the carrier oscillator 65 is operating. Thus, the carrier oscillator 65 is operating as the local oscillator for the modulator 31 and the demodulator 53. If the transmitter portion 14a of modem 14 is operated with no signal being received by the receiver portion 14b of modem 14 a negative signal is applied to the terminal 48 to lock the circuit 67 and the local-remote switch 68 in the described operating position. The transmitter portion 14a is now the master and any remote modem receiver portions and associated transmitter portions will become the slave and will be synchronized to the carrier oscillator 65. Even though a signal is received and a negative signal is applied to the input terminal 82, this negative signal will have no effect on the priority lockout circuit 67. When the transmission is completed and the negative signal is removed from the terminal 48 the operation of the oscillator/switch 32 will remain the same, but the lockout is removed. Thus, if a negative signal is now applied to the terminal 82 the carrier oscillator 65 will be deactivated and the transistor 90 will begin to conduct and cut off the transistor 95. With the transistor 90 conducting the separated carrier applied to the input terminal 94 will appear at the common output terminal 96 and synchronize the output signals from the modulator 31 and demodulator 53 to the remote carrier. Thus, the remote modem transmitter portion is the master and the local modem transmitter and receiver portions are slaved or synchronized thereto. Further, with a negative signal on the terminal 48 the lockout circuit 67 is in operation so that a subsequent negative signal on the terminal 82 will have no effect.

Thus, automatic master-slave carrier switching apparatus is described which allows any modem transmitter portion in the system to become the master and one or more modems in communication therewith, along with the associated receiver portion, will become slaves synchronized thereto. Only the transmitter portion which is the master transmits a portion of the carrier so that the slave transmitter portion does not need to transmit carrier and, therefore, the power consumed in the transmission is somewhat reduced. Further, the transmitter portion and the associated receiver portion are synchronized so that data can be transmitted to a remote modem and retransmitted to the associated receiver portion to check the accuracy, reception, etc. and because the signals are synchronized they can be quickly and easily compared. Many other advantages will be readily apparent to those skilled in the art. While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:

1. In a suppressed carrier, communications system including at least two, spaced apart, transmitter-receivers wherein a portion of the carrier is transmitted for use as a synchronizing signal, automatic master-slave carrier switching apparatus associated with each of said transmitter-receivers comprising:
    a. a carrier oscillator providing an output signal at the carrier frequency;
    b. filter and amplifier means coupled to the associated receiver for separating the transmitted carrier from received signals;
    c. control means coupled to the associated transmitter-receiver for providing a local control signal when the associated transmitter is operated and no signal is being received and for providing a remote control signal when a signal is being received and the associated transmitter is not being operated;
    d. local and remote switch means connected to operatively couple said carrier oscillator to the associated transmitter-receiver in a first mode of operation and to operatively couple the separated carrier from said filter and amplifier means to the associated transmitter-receiver in a second mode of operation, said switch means normally being in the first mode of operation and switching to the second mode of operation upon receiving an actuating signal; and e. priority lockout means coupled to receive the local and remote control signals from said control means and supply an actuating signal to said switch means upon receiving a remote control signal, said priority lockout means maintaining said switch means in the first or the second mode of operation throughout the duration of the first of the local or remote control signals, respectively, to be applied thereto.

2. Automatic master-slave carrier switching apparatus as claimed in claim 1 wherein the local and remote switch means includes a pair of emitter coupled transistors one of which is biased normally in a conducting state and the other of which is coupled to receive an activating signal from the priority lockout means.

3. Automatic master-slave carrier switching apparatus as claimed in claim 1 wherein the priority lockout means includes a dual input, flip-flop circuit having two modes of operation and constructed to remain in either mode in response to a continuing signal on either of the dual inputs.

4. Automatic master-slave carrier switching apparatus as claimed in claim 1 wherein the carrier oscillator includes a crystal controlled oscillator operating at approximately 5.2 megahertz.

5. Automatic master-slave carrier switching apparatus as claimed in claim 1 including in addition oscillator power switch means connected to receive the remote control signal and further connected to apply operating power to said carrier oscillator in the absence of a remote control signal and to remove operating power from said carrier oscillator during the presence of a remote control signal.

6. In a suppressed carried, communications system including at least two, spaced apart, transmitter-receivers wherein a portion of the carrier is transmitted for use as a synchronizing signal, the method of switching between master and slave carriers comprising the steps of:

a. generating a local carrier;
b. generating a local control signal when the local transmitter is operated and no signal is being received;
c. generating a remote control signal when a signal including a remote carrier is received and the local transmitter is not operating;
d. separating the remote carrier from the received signal;
e. utilizing the local carrier for a synchronizing signal in the local transmitter-receiver either with no control signals present or in response to the generation of a local control signal; and
f. utilizing the remote carrier for a synchronizing signal in the local transmitter-receiver in response to the generation of a remote control signal.

7. The method of switching between master and slave carriers as claimed in claim 6 including in addition the step of discontinuing the generation of a local carrier during the generation of a remote control signal.

8. The method of switching between master and slave carriers as claimed in claim 6 including in addition the step of preventing the generation of one of the local and remote control signals during the generation of the other of the local and remote control signals.

* * * * *